Patented Aug. 25, 1936

2,052,423

UNITED STATES PATENT OFFICE 2,052,423

TREATMENT OF RUBBER

Lorin B. Sebrell, Silver Lake, Ohio, assignor to Wingfoot Corporation, Wilmington, Del., a corporation of Delaware No Drawing. Application March 30, 1934, Serial No. 718,215

11 Claims. (Cl. 260—1)

This invention relates to a method of treating rubber and refers particularly to the second step of a two-step process in which rubber is converted to a thermoplastic condensation derivative by first forming an addition compound of the rubber and then decomposing it to obtain the condensation derivative.

Thermoplastic condensation derivatives of different softening points may be produced. They form a desirable basis for coating compositions and may be employed as molding materials, etc. Oxidation of such materials is in many ways undesirable. The oxidized material is not as suitable for coating compositions as unoxidized material because it is not as readily soluble in the usual organic solvents as the unoxidized, and a solution of material which has been oxidized is not as clear as a solution of unoxidized material. Also, the oxidized material does not mold as readily as the unoxidized material. A condensation derivative designed for either use is therefore advantageously protected from oxidation.

According to this invention such thermoplastic rubber derivatives are obtained from solutions of reacted rubber cements by precipitation in water which contains a small amount of a reducing agent. Preferably the cement is poured into a large amount of water, so that in the emulsion formed the water forms the continuous phase, and the cement the discontinuous phase. By steam distillation of the emulsion the solvent is evaporated and the condensation derivative of the rubber precipitated. The reducing agent prevents oxidation of the condensation derivative during the steam distillation.

The condensation derivative may, for example, be prepared by treating a boiled solution of rubber in an organic solvent with the halide of an amphoteric metal, such as stannic chloride, ferric chloride, chromic chloride or aluminum chloride and the reacted cement thus obtained poured into a large volume of water which contains a reducing agent. The product obtained by this process, when purified, is apparently a hydrocarbon having the formula $(C_5H_8)_x$. Halogen-containing condensation derivatives of rubber may be prepared by reacting rubber with chlorostannic acid or by reacting rubber with the halide of an amphoteric metal, such as stannic chloride or ferric chloride in the presence of hydrochloric acid, and pouring the reaction product into a large volume of water which contains a reducing agent. Suitable reducing agents include sodium sulfite, hydoquinone and sodium sulfide.

It appears that by reacting on a rubber cement in any of these ways a metallic addition compound of rubber, such as $(C_5H_8)_x.SnCl_4$ is first formed, and on pouring the metallic addition compound into water the metal, etc. split off and a condensation derivative of the rubber is formed.

A condensation derivative of rubber may for example be prepared as follows:

Pale crepe rubber is plasticized to a plasticity of 300 as measured by a Williams plastometer. The plasticized rubber is dissolved in sufficient benzene to form a 10% solution. Three hundred fifty gallons of this cement is placed in a Day mixer equipped with a reflux condenser and heated with 10% of crystalline chlorostannic acid $(H_2SnCl_6.6H_2O)$ based on the weight of the rubber. The nature of the product obtained depends upon the extent to which the chlorostannic acid reacts on the rubber. A product of lower softening point is first produced and the softening point gradually increases as the reaction proceeds. The reaction may for example be allowed to progress until a reaction product is obtained which on quenching in water gives a material which may satisfactorily be molded at 260–300° F. A product of this softening point may be advantageously dissolved in benzene or chloroform or gasoline or other low boiling solvent to give a coating composition. A material of higher or lower softening point may be produced, if desired.

When the chlorostannic acid reaction has progressed to the point desired the reaction is advantageously terminated by adding ½ pound of water for each pound of chlorostannic acid used. The material is then cooled and filtered and the filtered product poured into water which contains the reducing agent. It is advantageous to use a large volume of water, for example 2½ gallons for each gallon of reacted cement, with ¾ of an ounce of sodium sulfite for each gallon of water used, and with vigorous agitation of the water to produce a fine emulsion. In this water soluble impurities are removed. The benzene may then be volatilized by distillation with steam and the condensation derivative precipitated in finely divided form. It is advantageously recovered from the solution by centrifuging and is dried in a vacuum to prevent oxidation.

Organic solutions of reacted cements prepared in other ways as by the reaction of a halide of an amphoteric metal on rubber in solution in any organic solvent immiscible with water may similarly be treated in a reducing solution to remove water soluble impurities and precipitate the condensation derivative. On distilling off the solvent the condensation derivative is obtained in an unoxidized condition.

This application is in part a continuation of my application Serial No. 654,248, filed Jan. 30, 1933.

What I claim is:

1. The method of forming a thermoplastic condensation derivative of rubber which comprises reacting on rubber in solution in an organic solvent immiscible with water, with chlorostannic acid, pouring the reacted cement into a large volume of water containing a reducing agent, and then volatilizing the solvent.

2. The method of forming a thermoplastic condensation derivative of rubber which comprises reacting on rubber in solution in an organic solvent immiscible in water with a halide of an amphoteric metal, pouring the reacted cement into a large volume of water containing a reducing agent, and then volatilizing the solvent.

3. The method of obtaining a thermoplastic condensation derivative of rubber which comprises reacting a rubber cement with stannic chloride, pouring the reacted cement into a large volume of water containing sodium sulfite and then distilling off the solvent.

4. The method of obtaining a thermoplastic condensation derivative of rubber which comprises reacting a rubber cement with the halide of an amphoteric metal and hydrogen chloride, pouring the reacted cement into a large volume of water containing sodium sulfite and then distilling off the solvent.

5. The method of obtaining a thermoplastic condensation derivative of rubber which comprises reacting a rubber cement with the halide of an amphoteric metal, pouring the reacted cement into a large volume of water containing sodium sulfite and then volatilizing the solvent.

6. The method of obtaining a thermoplastic condensation derivative of rubber which comprises reacting a rubber cement with chlorostannic acid, pouring the reacted cement into a large volume of water containing sodium sulfite and then volatilizing the solvent.

7. In the process of preparing condensation derivatives of rubber which are decomposition products produced by the addition of water to metallic addition products of rubber, the step which comprises decomposing said addition products by a large volume of water in which a reducing agent is dissolved.

8. In the process of preparing condensation derivatives of rubber which are decomposition products produced by the addition of water to metallic addition products of rubber, the steps which comprise decomposing by water said addition products while in solution in solvent immiscible with water and forming an emulsion in which the solution of the decomposition product in the solvent forms the discontinuous phase and a solution of a reducing agent in water forms the continuous phase and volatilizing solvent from the solution while emulsified in the aqueous solution of the reducing agent.

9. In the process of producing condensation derivatives of rubber, the steps which comprise obtaining the condensation derivative in solution in a volatile solvent by decomposing with water an addition product of rubber, which on decomposition yields a condensation derivative of rubber and a water-soluble by-product, and removing the solvent by distillation while the solution is suspended as droplets in an aqueous solution of a reducing agent.

10. The method of obtaining condensation derivatives of rubber in a substantially unoxidized condition and free from water-soluble impurities which comprises volatilizing solvent from a solution of the condensation derivative in a solvent which is immiscible with water while the solution is suspended in the form of droplets in an aqueous solution of a reducing agent.

11. In the process of producing condensation derivatives of rubber by the process which involves treating the rubber with a reagent which forms therewith an addition compound which is decomposable by water into the condensation derivative and water-soluble impurities and from which the condensation derivative is recovered in a condition substantially free from water-soluble impurities by volatilization of solvent therefrom while a solution thereof in a solvent immiscible with water is suspended in water as droplets, the improvement which comprises volatilizing the solvent from such a solution of the condensation derivative while the solution of the condensation derivative is suspended as droplets in an aqueous solution of a reducing agent.

LORIN B. SEBRELL.

CERTIFICATE OF CORRECTION.

Patent No. 2,052,423.  August 25, 1936.

LORIN B. SEBRELL.

It is hereby certified that error appears in the printed specification of the above numbered patent requiring correction as follows: Page 1, second column, line 42, before the word "water" insert way; and that the said Letters Patent should be read with this correction therein that the same may conform to the record of the case in the Patent Office.

Signed and sealed this 5th day of January, A. D. 1937.

Henry Van Arsdale (Seal)

Acting Commissioner of Patents.